United States Patent [19]

Hayashi et al.

[11] 4,456,310
[45] Jun. 26, 1984

[54] HYDRAULIC PUMP AND ANTI-SKID BRAKE SYSTEM

[75] Inventors: Tsutomu Hayashi, Hoya; Masaie Kato, Musashino; Mitsuru Saito, Koganei, all of Japan

[73] Assignee: Honda Giken Kogyo Kabushiki Kaisha, Tokyo, Japan

[21] Appl. No.: 263,347

[22] Filed: May 13, 1981

[30] Foreign Application Priority Data

| May 15, 1980 | [JP] | Japan | 55-64539 |
| May 15, 1980 | [JP] | Japan | 55-64538 |
| Sep. 25, 1980 | [JP] | Japan | 55-133314 |

[51] Int. Cl.³ .............................................. B60T 8/02
[52] U.S. Cl. .................................. 303/10; 188/181 R; 188/344; 188/345; 303/116; 303/119; 417/569
[58] Field of Search ............... 417/214, 471, 569, 571; 303/10, 11, 12, 116, 113, 3, 114, 115, 2, 119, 61, 63, 68, 69, 6; 188/181 A, 181 R, 181 T, 344, 345, 352; 192/4 A, 4 R, 12 R, 13 R

[56] References Cited

U.S. PATENT DOCUMENTS

| 2,796,769 | 6/1957 | Gratzmuller | 417/569 |
| 3,227,093 | 1/1966 | Taplin | 417/571 |
| 3,521,934 | 7/1970 | Leiber | 303/10 X |
| 3,840,087 | 10/1974 | Von Loewis et al. | 303/10 X |
| 4,154,326 | 5/1979 | Wolf | 303/10 X |
| 4,166,657 | 9/1979 | Blomberg et al. | 303/116 |

Primary Examiner—Douglas C. Butler
Attorney, Agent, or Firm—Posnack, Roberts, Cohen & Spiecens

[57] ABSTRACT

A hydraulic pump with an unloading function which comprises a pump body, a spring chamber formed in the pump body and communicating with a fluid reservoir, a pump chamber formed in the pump body and communicating with the spring chamber and an accumulator through a suction valve and a delivery valve, respectively. An operation chamber is also formed in the pump body and accommodates a drive member such as a pump drive shaft. A plunger slidably extending through a first partition between the spring chamber and the pump chamber, and a tappet having a smaller diameter than that of the plunger and slidably extends through a second partition between the pump chamber and the operation chamber to abut against the plunger. A spring is accommodated in the spring chamber and is adapted to apply a predetermined resilient force to the plunger to bias it toward the tappet.

21 Claims, 14 Drawing Figures

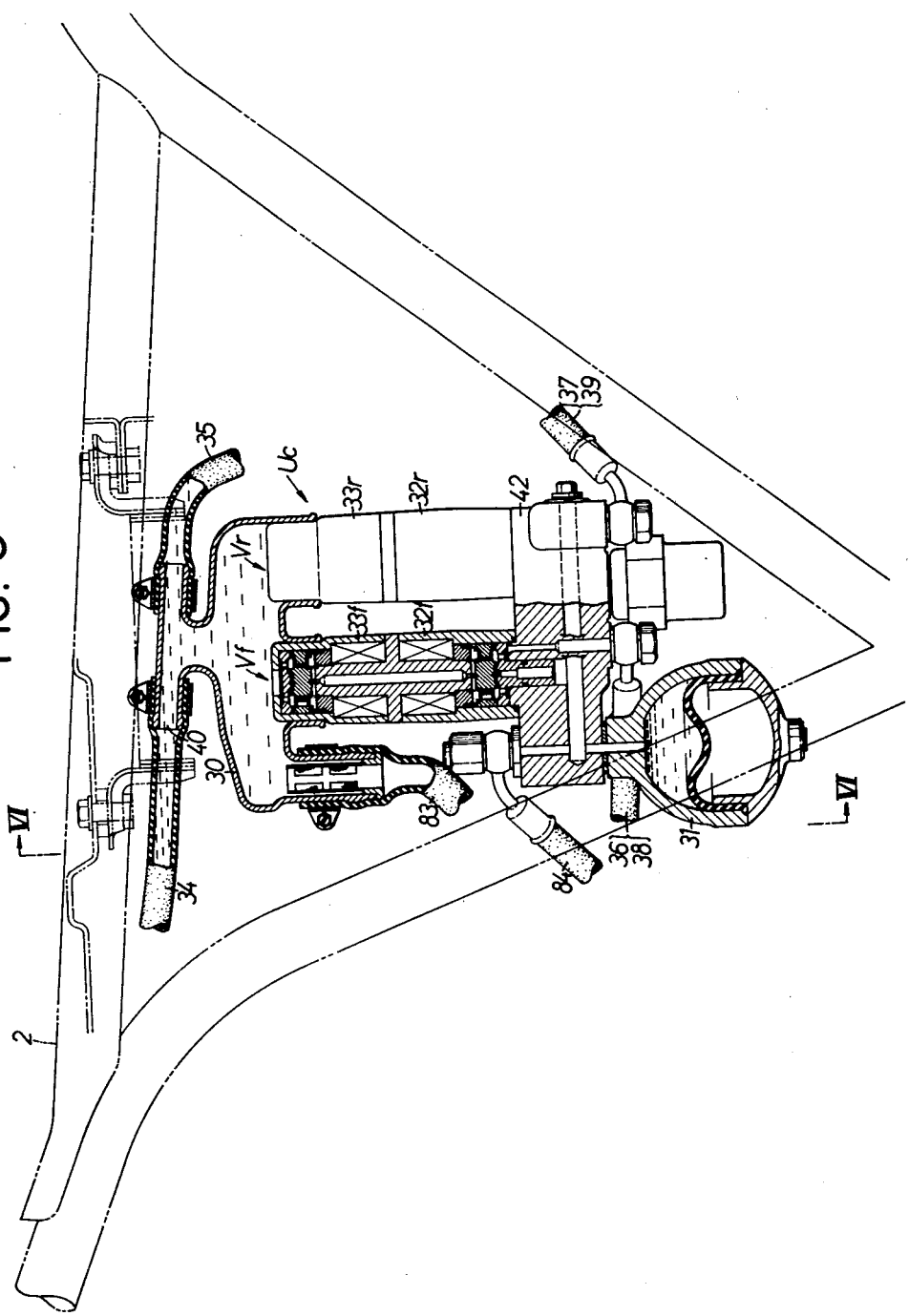

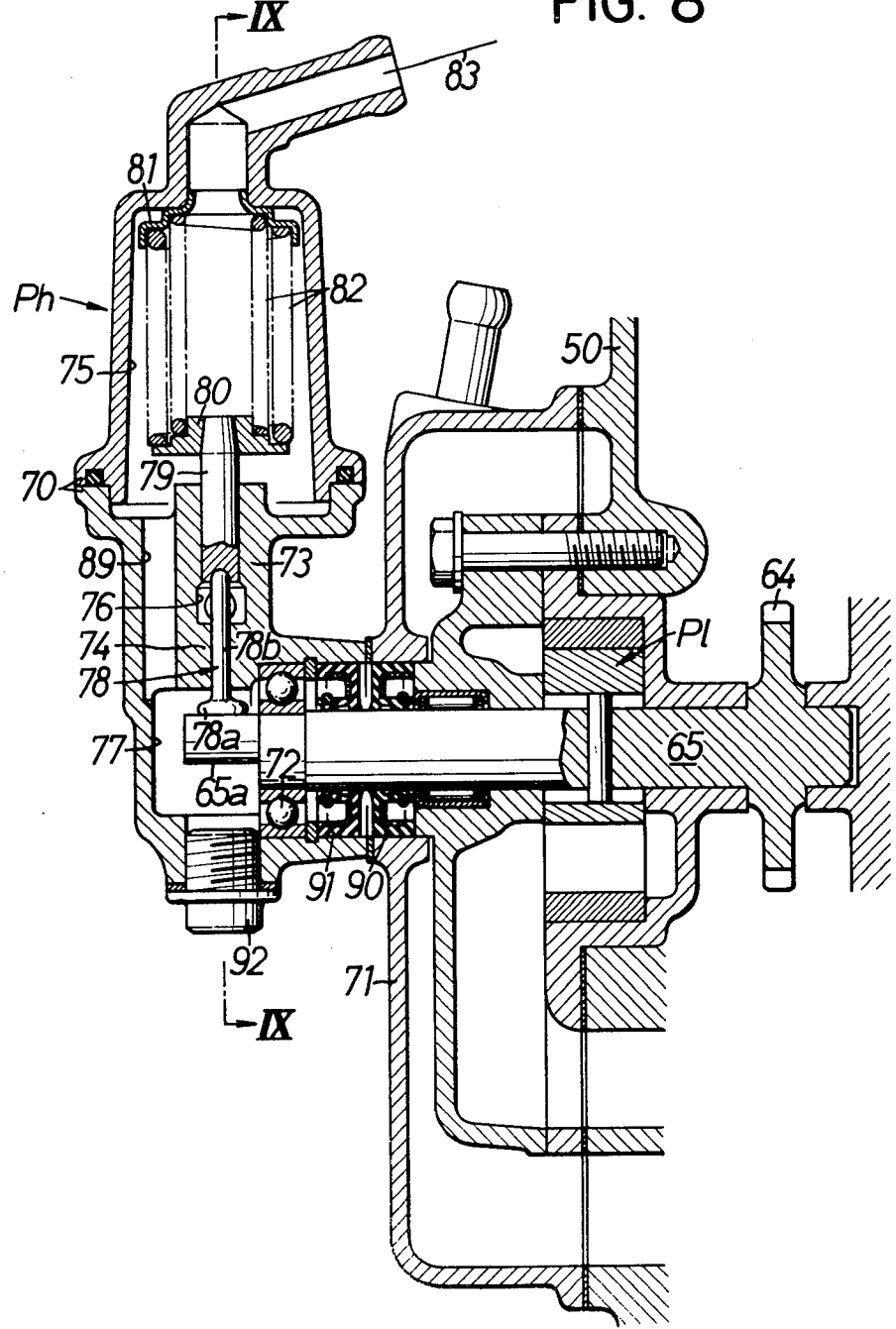

HYDRAULIC PUMP AND ANTI-SKID BRAKE SYSTEM

BACKGROUND OF THE INVENTION (a) Field of the Invention

The present invention relates to a hydraulic pump for producing working hydraulic pressure for operation of various kinds of hydraulic apparatus, such as an anti-lock brake controller of vehicles.

(b) Description of Prior Art

In general, in vehicles, particularly small-sized vehicles such as motorcycles, it is quite effective in improving the dynamic performance of the vehicle to adopt a so-called unloader system which is adapted to unload the engine by disconnecting the hydraulic pump when a predetermined pump outlet pressure is obtained.

One of the conventional means of utilization of the hydraulic pump as the pressure source of the anti-lock brake control system of the vehicle employs a control hydraulic pressure chamber disposed in the actuator of the wheel brake and adapted to apply a back pressure to the actuator thereby to reduce the braking torque produced by the wheel brake, and solenoid valves disposed in respective hydraulic passages between the control hydraulic pressure chamber and an oil reservoir and between the control hydraulic pressure chamber and an accumulator and adapted to open and close these passages selectively. In this case, the hydraulic pump is disposed between the oil reservoir and the accumulator to charge the latter with pressurized working fluid or oil.

The hydraulic pump can be driven either by an electric motor or by the engine for driving the vehicle. The former method, however, is not suitable for small-sized vehicles such as motorcycles because the pump consumes the electric power which is impractically large as compared with the capacity of batteries, resulting in an unstable operation of the solenoid control valves and other electric equipment. In the latter method, if the hydraulic pump is continuously driven by the engine, the output power of the engine and, accordingly, the dynamic performance of the engine is deteriorated more or less.

SUMMARY OF THE INVENTION

Accordingly, an object of the present invention is to provide a hydraulic pump having a simple construction and easy to produce at a low cost, with such an unloading function as adapted to stop the pumping operation when a predetermined volume of pressure fluid is reached in an accumulator to relieve the engine from the load for driving the hydraulic pump, thereby to overcome the above-described problems of the prior art.

Another object of the invention is to provide an anti-lock braking system for vehicles, employing the above-mentioned hydraulic pump with unloading function as the source of the hydraulic pressure.

A still further object of the invention is to provide an anti-lock braking system of a vehicle in which a hydraulic pump is connected to the crankshaft of the engine without a driving clutch interposed therebetween to permit the hydraulic pump to be driven by the engine independently of the state of the driving clutch which connects the engine crankshaft to the driving wheels, so that the accumulator is sufficiently loaded even during the snapping preparing for the starting of the vehicle, as well as during the warming up after the start-up of the engine,, to make it possible to complete the preparation for the operation of the anti-lock braking system before the starting up of the vehicle.

A further object of the invention is to provide an anti-lock braking system for vehicles, particularly motorcyles, in which the hydraulic pump is driven by the engine at a predetermined speed reduction ratio to avoid overspeed of the hydraulic pump and, hence, the generation of bubbles attributable to an excessive stirring of the working fluid.

A still further object of the invention is to provide an anti-lock braking system for vehicles in which the oil passage interconnecting the oil reservoir, hydraulic pump and the accumulator in series is made to have a reduced length and means are provided for optimizing the operation speed of the hydraulic pump over the entire load range of the engine operation including idling to improve the pump efficiency, thereby to ensure a good anti-lock braking operation.

A still further object of the invention is to provide an anti-lock braking system for vehicles, in which the oil reservoir, accumulator and the solenoid control valves are constructed as an anti-lock control unit to simplify the construction of the hydraulic control circuit thereby to permit an easier inspection and maintenance of the constituents mentioned above, as well as a simple replacement of these constituents as a unit.

A still further object of the invention is to provide an anti-lock braking system for vehicles, particularly for motorcycles, in which the hydraulic pump for loading the accumulator with the pressurized working fluid is attached to the outside of the power unit of the vehicle for easier inspection and maintenance, but the hydraulic pump does not project laterally from the motorcycle, so that the hydraulic pump does not spoil the appearance of the motorcycle or hinder maneuvering by the rider.

The above and other objects, features and advantages of the invention will be apparent from the following detailed description of the invention when taken in conjunction with the accompanying drawing which illustrates a few presently preferred embodiments of the invention.

BRIEF DESCRIPTION OF THE DRAWINGS

FIG. 5 is a partly broken side elevational view of an anti-lock control unit;

FIG. 8 shows in vertical sectional front elevation view the hydraulic part and its periphery;

DESCRIPTION OF THE PREFERRED EMBODIMENTS

Preferred embodiments of the invention will be described hereinafter with reference to the attached drawings.

Figure 1:
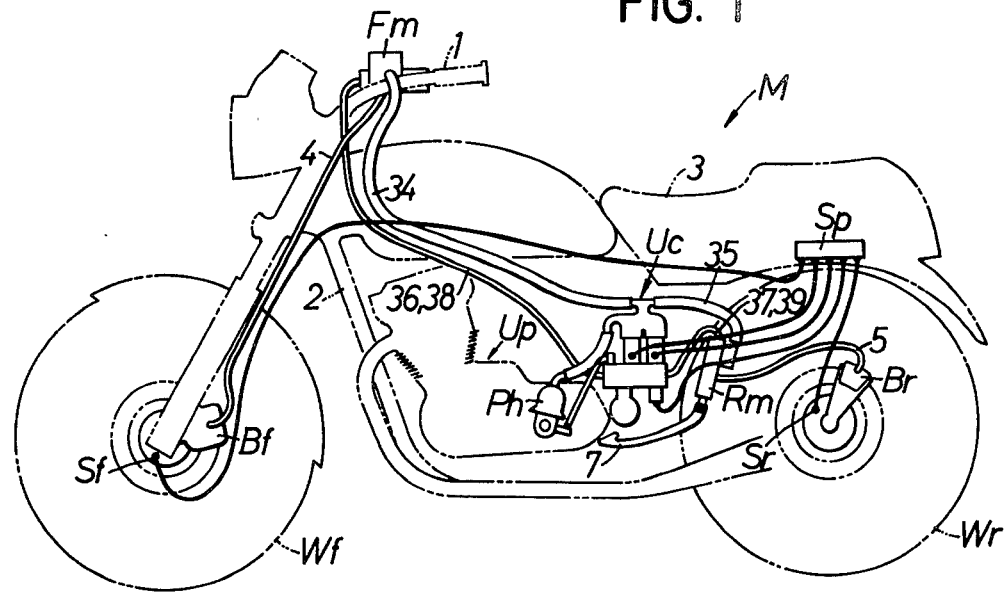
FIG. 1 is a schematic side elevational view of a motorcycle showing particularly a brake control system of the motorcycle.
Figure 2:
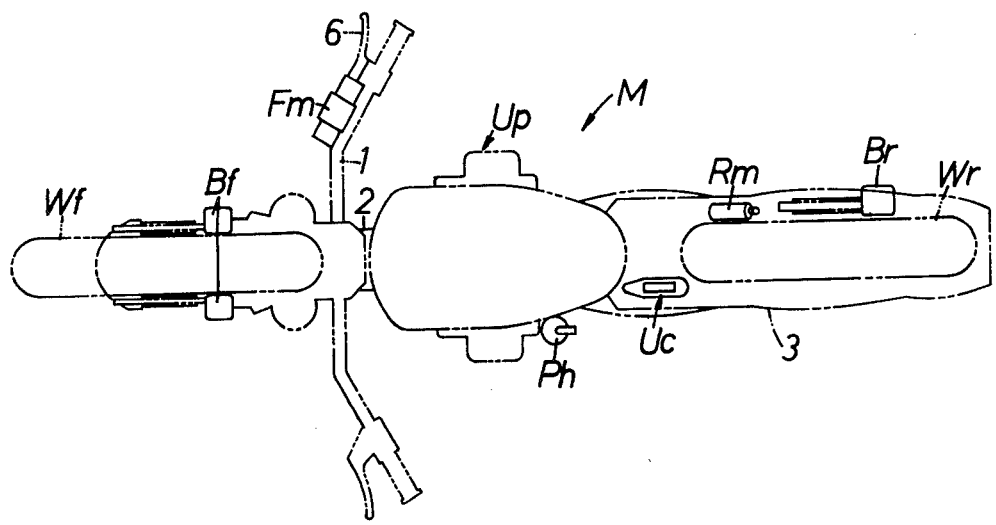
FIG. 2 is a plan view of the motorcycle.

Referring first to FIGS. 1 and 2, a motorcycle M has a front wheel brake Bf and a rear wheel brake Br which are adapted to actuated hydraulically. The front wheel brake Bf is connected through a conduit 4 with a front master cylinder Fm mounted on a steering handle bar 1, while the rear wheel brake Br is connected through a conduit 5 to a rear master cylinder Rm which is mounted on the portion of the chassis frame 2 below a saddle 3. The front and rear master cylinders Fm and Rm are actuated by a brake lever 6 and a brake pedal 7, respectively.

A power unit Up is mounted on the portion of the frame 2 between the front and rear wheels Wf,Wr of the motorcycle M. An anti-lock control unit Uc mounted just behind the power unit Up is adapted to control the operation of the master cylinders Fm and Rm during the braking thereby to prevent the front and rear wheels Wf,Rf from skidding on the road.

A front wheel speed sensor Sf produces an anti-lock control signal for the front master cylinder Mf, while a rear wheel speed sensor Sr provides an anti-lock control signal for the rear master cylinder Mr. These signals are delivered to the control unit Uc via the signal processing device Sp.

Figure 3:
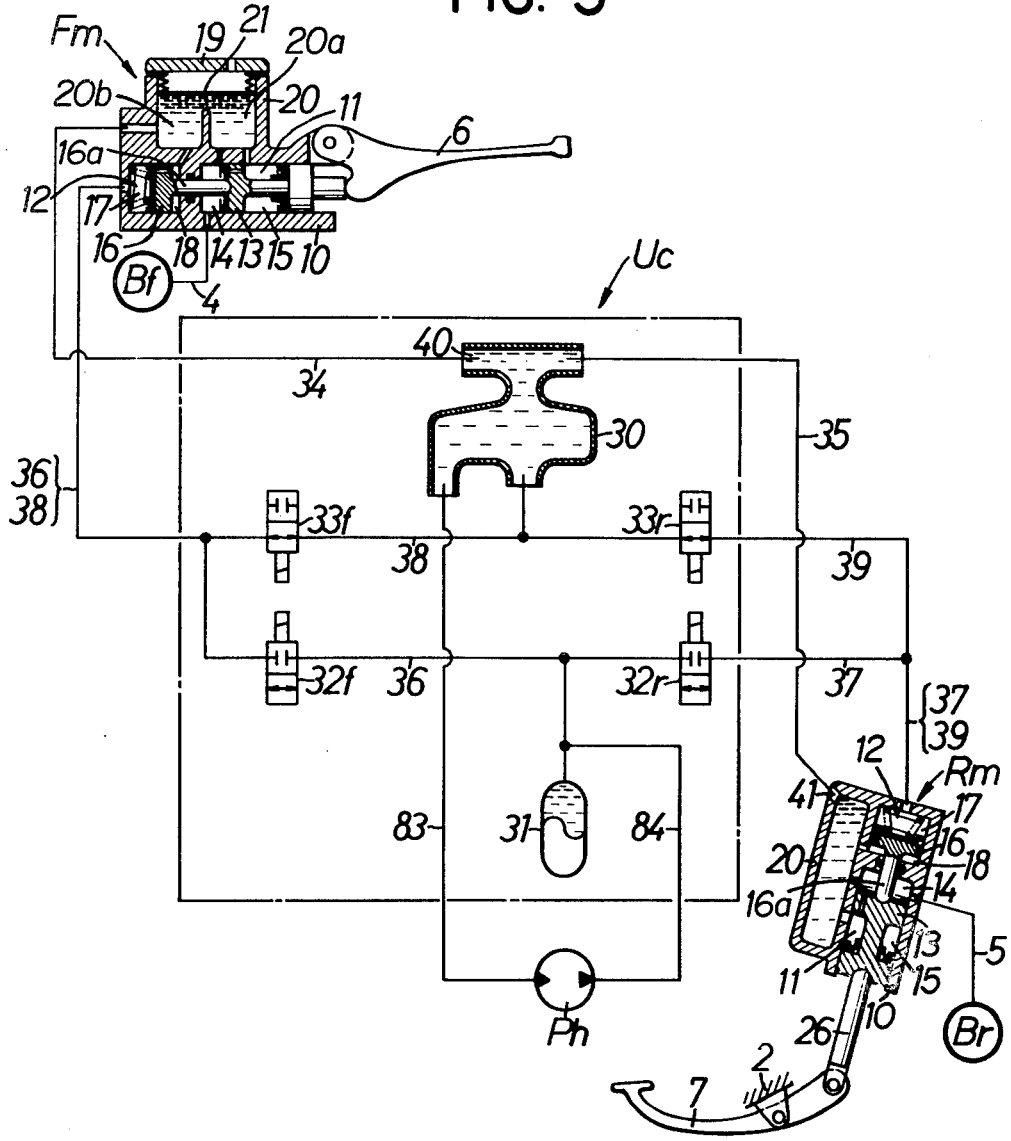
FIG. 3 shows a hydraulic circuit for the brake system.

FIG. 3 shows the details of construction of various parts. The cylinder body 10 of the front master cylinder Fm has a pair of cylinder bores 11,12 which are arrayed horizontally and in series with each other. Bore 11 slidably receives an operation piston 13 which divides the space in the bore 11 into a front output chamber 14 and a rear supply chamber 15, while the bore 12 accommodates a control piston 16 which divides the space in the bore into a front control chamber 17 and a rear supply chamber 18. The operation piston 13 is connected at its rear end to brake lever 6, while the control piston 16 has, as will be seen from FIG. 4, a piston rod 16a extending rearwardly from the rear end thereof beyond a partition between the two bores 11,12 into abutment with the front end of the operation piston 13. At the front faces of the pistons 13,16 are oil supply ports 15a,18a which communicate with respective supply chambers 15,18. The pistons 13, 16 are provided at their front sides with elastic seal cups 13c,16c adapted for opening and closing the supply ports 15a,18a. In addition, there is formed integrally at the upper side of the cylinder body 10, an oil reservoir 20 having an upper opened end closed with a cap 19. The space inside the oil reservoir 20 is divided into two sections 20a,20b by a bulkhead 21 of a constant height. Chamber 20a is adapted to be connected to the output chamber 14 and the supply chamber 15 respectively through a relief port 22 and a supply port 23 when the operation piston 13 is in the retracted position, while the other chamber 20b is connected to the supply chamber 18 through the supply port 24.

A return spring 25 in the hydraulic control chamber 25 is adapted to bias the pistons 13,16 in the retracting direction so that the conduit 4 leading to the front wheel brake Bf is connected to the output chamber 14.

The reason why the space inside the oil reservoir 20 is divided into two sections 20a,20b by the bulkhead 21 of constant height is to ensure the safe operation of at least the front wheel brake Bf in the event of a leakage in the system connected to the control chamber 17, by preventing the evacuation of the section 20a. Usually, the oil reservoir 20 is filled up to a level above the top of the barrier 21.

The rear master cylinder Rm has a construction materially identical to that of the front master cylinder Fm except that the cylinder bores are arranged vertically, that the operation piston 13 is connected to the brake pedal 7 through a push rod 26 and that the reservoir 20 has no cap or barrier. The parts or members which are the same as those of the front master cylinder Mf are denoted by the same reference numerals. The conduit 5 leading to the rear brake wheel Br is connected to the output chamber 14 of the rear master cylinder Rm.

The anti-lock control unit Uc is composed of an auxiliary reservoir 20, accumulator 31, a pair of normally-closed solenoid control valves 32f,32r and a pair of normally-opened solenoid control valves 33f,33r. The auxiliary reservoir 30 interconnects the oil reservoirs 20,20 of the front and rear master cylinders Fm,Rm through conduits 34,35. More specifically, the normally-closed type control valve 32f is disposed in the passage 36 interconnecting the accumulator 31 and the control chamber 17 of the front master cylinder Fm, while the valve 32r is disposed in the conduit 37 which connects the accumulator 31 to the control chamber 17 of the rear master cylinder Rm. The normally-opened solenoid control valve 33f is disposed in the conduit 38 between the auxiliary reservoir 30 and the control chamber 17 of the front master cylinder, while the valve 33r is disposed in the conduit 39 between the auxiliary reservoir 30 and the control chamber 17 of the rear master cylinder Rm.

The accumulator 31 is adapted to be loaded with pressurized working fluid by the operation of a hydraulic pump Ph of the invention having an unloading function. The construction of this pump will be fully explained later.

As will be clearly understood from FIGS. 1 and 3, three reservoirs 20,30 and 20 in mutual communication are arranged from the upper side to the lower side in the mentioned order, so that the lower reservoirs 30, 20 are charged with the working fluid as the latter is supplied to the uppermost reservoir 20. In this case, it is quite effective to provide the inlets 40,41 of the lower reservoirs 30,20 at their top ends, for removing any bubbles in their reservoirs.

Figure 6:
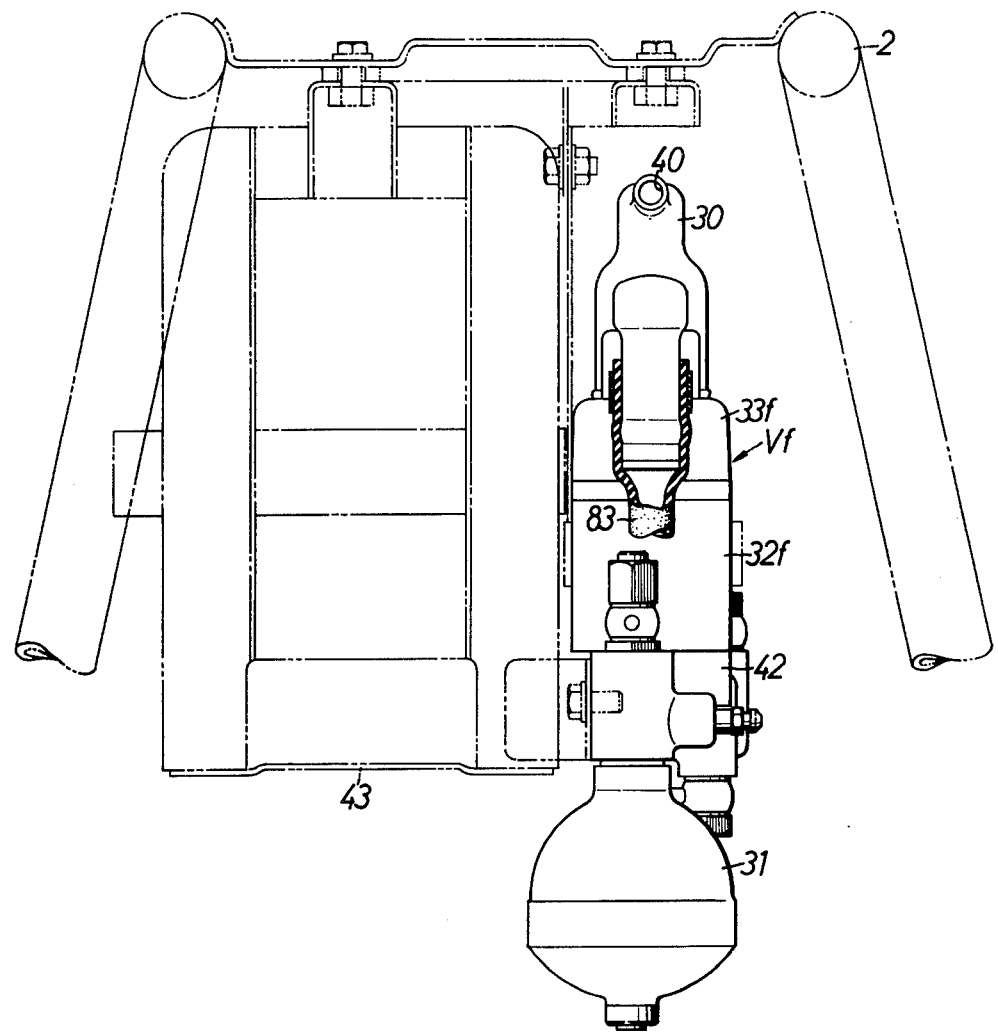
FIG. 6 is a front elevational view of the anti-lock control unit.

The control unit Uc will be explained in more detail with specific reference to FIGS. 5 and 6. As will be seen from these Figures, the control unit Uc is mounted on the portion of the frame 2 between the power unit Up and the rear wheel Wr and at the breadthwise center of the motorcycle. More specifically, the control unit Uc has a base 42 fixed together with a battery box 43 to the breadthwise central portion of the frame 2 of the motorcycle M. A columnar front control valve unit Vf in which the control valves 32f,33f are constructed as a unit, and a columnar rear control valve unit Vr in which the control valves 32r,33r are constructed as a unit are secured to the upper side of the base 42. Secured to the upper ends of the units Vf and Vr, is the auxiliary reservoir 30 so as to combine these units Vf,Vr. The accumulator 31 is attached to the lower side of the base 42. Thus, the control unit Uc as a whole has a flattened form, so that it can easily be mounted even in the restricted area in the frame 2. It is, therefore, possible to dispose the control unit Uc in the frame 2 adjacent to the battery box 43.

Figure 7:
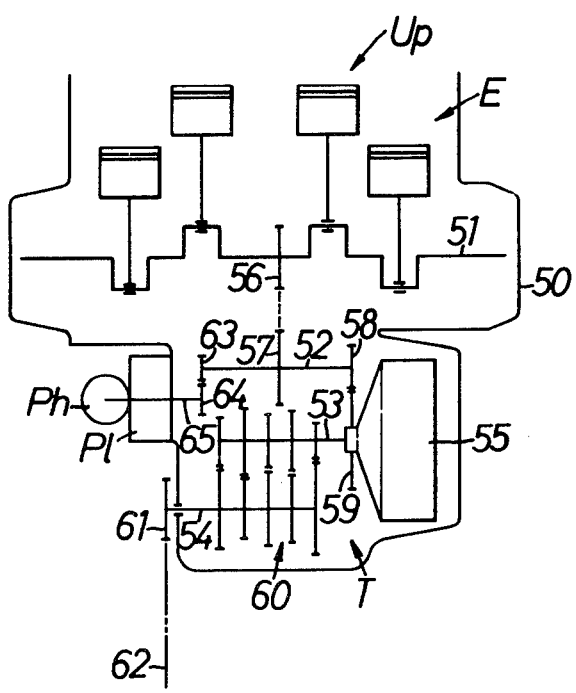
FIG. 7 is an illustration of the outline of a power unit.

The construction of the power unit will be explained hereinunder with reference to FIG. 7. The power unit Up has an engine E and a transmission T accommodated in a common casing 50 in which a crankshaft 51, intermediate shaft 52 and transmission input and output shafts 53,54 are arranged in parallel from the front side of the casing 50 in the mentioned order. The shafts 52,53 and 54 have lengths smaller than the length of the crankshaft 51. A starting clutch 55 is provided at the input end of the input shaft 53. The output torque from the crankshaft 51 is transmitted to the intermediate shaft 52 through a primary reduction gear or sprockets 56,57 and further to the starting clutch 55 through a secondary reduction gear or sprockets 58,59. If the clutch 55 is in the connecting condition, the output torque is transmitted to the input shaft 53 and further to the output shaft 54 through the transmission mechanism 60.

The end of the output shaft 54 opposite the clutch 55 projects to the outside of the casing 50, and is provided with a driving sprocket 62 which is adapted to drive the rear wheel Wr through a chain 62 as the torque is transmitted thereto.

The casing 50 also accommodates a pump drive shaft 65 arranged in parallel with the intermediate shaft 52 and adapted to be driven by the latter through the gears 63,64. The hydraulic pump Ph and an engine lubricating pump Pl are driven by the pump shaft 65. These pumps Ph,Pl are attached to the side wall of the casing 50 opposite the clutch 55 so as to be concealed behind the crank chamber accommodating the crankshaft 51. This arrangement permits an efficient use of the dead space at the side of the casing 50 opposite the clutch 55.

Figure 11:
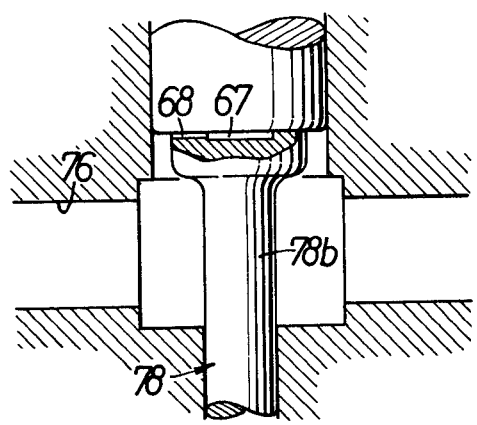
FIG. 11 is an enlarged view of the portion XI shown in FIG. 10.

Hereinafter, practical embodiments of the hydraulic pump Ph will be described with reference to FIGS. 8 and 11. The hydraulic pump Ph has a pump body 70 detachably attached to the outer surface of the casing 50 by means of a cover member 71, and cover member 71 supports the outer end of the pump drive shaft 65 through a bearing 72. The space inside the pump body 70 is divided into three chambers i.e. an upper spring chamber 75, a pump chamber 76 and an operation chamber 77, by means of a pair of partitions 73,74 spaced in the vertical direction.

An eccentric cam 65a projected from the outer end of the pump drive shaft 65 projects into the operation chamber 77. A large-diameter base portion 78a of a tappet 78 engages the peripheral surface of the cam 65a. The tappet 78 has a shaft 78b which slidably extends through the partition wall 74 into the pump chamber 76 to abut the lower end of a plunger 79. The shaft diameter of the tappet 78 is small as compared with the diameter of the plunger 79.

A movable seat plate 80 and a stationary seat plate 81 are fixed to the upper end of the plunger projecting into the spring chamber 75 and to the top wall of the spring chamber 75, respectively. A spring 82 preloaded to a predetermined set load (60 Kg, for example) is compressed between the seat plates 80,81.

The spring chamber 75 is connected to the auxiliary reservoir 30 of the control unit Uc through a conduit 83, while the pump chamber 76 is connected to the accumulator 84 through a conduit 31. The spring chamber 75 and the pump chamber 76 are connected to each other through a passage 85 formed in the partition 73.

A check valve 86 disposed in this passage 85 is adapted to permit the fluid to flow only from the spring chamber 75 to the pump chamber 76, so as to act as a suction valve. On the other hand, another check valve 88 is disposed in a passage in a banjo coupling 87 between the pump chamber 76 and the conduit 84 so as to permit the fluid to flow only from the pump chamber 76 to the accumulator 31, i.e. to act as a delivery valve.

The working fluid charged into the spring chamber 75 comes into the operation chamber 77 through a passage 89 therebetween, so as to act as a lubricant in the chamber 77. The lubricating pump Pl is attached to the casing 50 at the inside of the cover member 71. The detailed description of this pump is omitted because this pump is a known trocoid pump.

In FIG. 8, reference numerals 90 and 91 denote oil seals provided in the openings in the cover member 71 and the pump body 70 penetrated by the pump drive shaft 65, while a numeral 92 denotes drain bolt screwed into the pump body 70.

The embodiment of the invention described heretofore operates in a manner explained hereinunder. Referring first to the driving system of the pump in connection with FIG. 7, as the engine E is started, the pump drive shaft 65 drives the lubricating pump Pl and the hydraulic pump Ph simultaneously at reduced speeds from the crankshaft 51 through the gears 56,57 and so forth. In consequence, excessive overspeed of these pumps Pl,Ph is avoided to contribute to the reduction of the load imposed upon the engine. Since the pumps Pl and Ph receive power from the engine E at the input side of the clutch 55, these pumps are safey operated even when the clutch 55 is in the disconnected state. This is convenient particularly for the hydraulic pump Ph acting as the pressure source of the anti-lock control of the front and rear wheel brakes Bf,Br, because the hydraulic pressure is maintained irrespective of whether the engine E is in the idling state or loaded.

Figure 9:
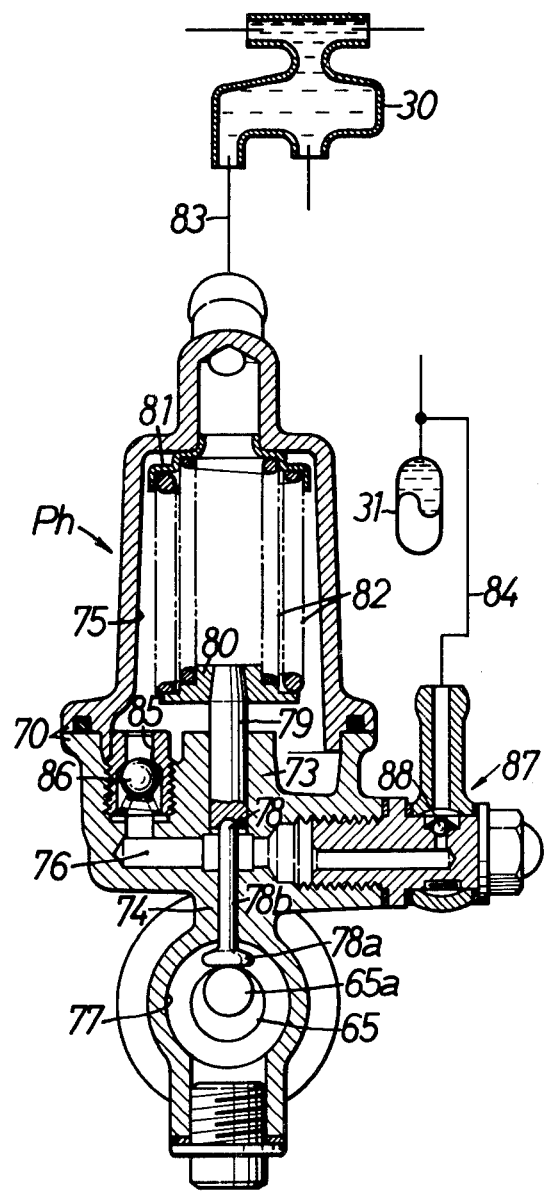
FIG. 9 is a sectional view taken along line IX—IX in FIG. 8.

Referring to FIGS. 8 and 9, as the pump drive shaft 65 is rotated, the eccentric cam 65a integral with the latter imparts a vertical reciprocating motion to the tappet 78 and the plunger 79 in cooperation with the spring 82. As a result of this reciprocating motion, the volume of the pump chamber 76 is increased and decreased repeatedly. As this volume is increased, the pressure in the chamber 76 is lowered to permit the suction valve 86 to open so that the working fluid which has been introduced into the spring chamber 75 from the auxiliary reservoir 30 is sucked into the pump chamber 76. In contrast, when the volume is decreased, the pressure in the pump chamber 76 is increased so that the pressurized fluid comes out of the pump chamber 76 into the accumulator 31, forcibly opening the delivery valve 88. As the pressure in the accumulator 31 reaches a predetermined valve, the pressure in the pump chamber 76 takes almost the same valve, so that the upward force exerted on the plunger 79 comes to balance the downward force of the spring 82, i.e. the set load, to maintain the plunger 79 at a position near the upper end of the stroke thereof. In this state, only the tappet 78 is moved up and down following the movement of the operation cam 65a.

In this state, the downward force acting on the tappet 78 is derived from the hydraulic pressure in the pump chamber 76, so that the suction valve 86 is maintained in the closed position by the pressure in the pump chamber 76. In consequence, the hydraulic pump Ph stops operating, so that the engine is relieved from wasteful load. Although a pressing force is exerted on the contacting surfaces of the tappet 78 and the eccentric cam 65a by the pressure in the pump chamber 76, this force is negligibly small because the diameter of the tappet 78 is sufficiently small, so that the load imposed on the engine by this force is also negligibly small.

Figure 10:
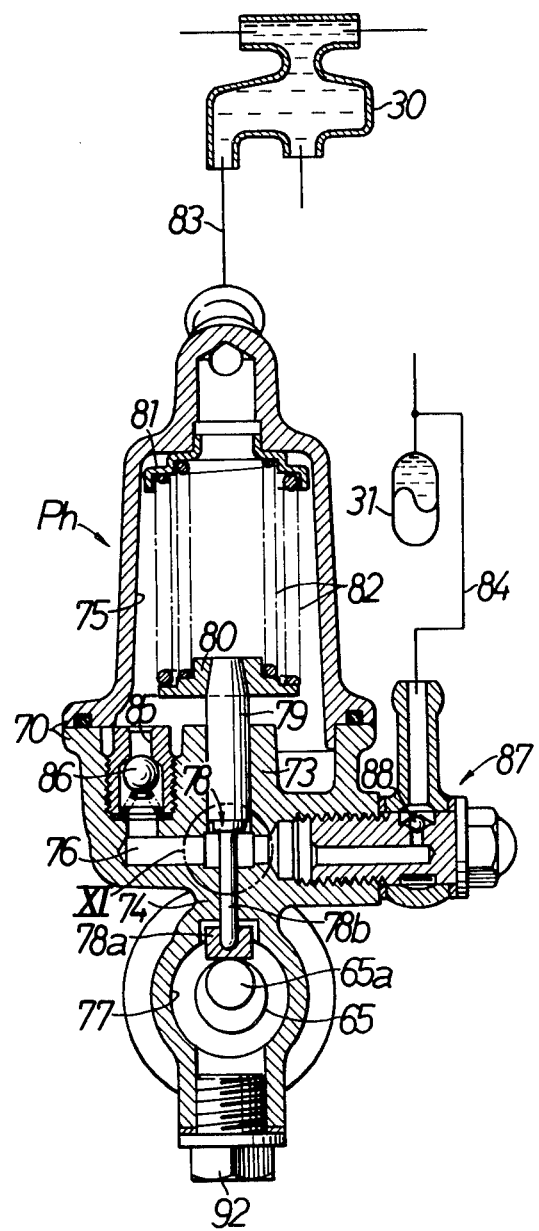
FIG. 10 is a view similar to that of FIG. 9, showing a modification of the hydraulic pump.
Figure 12:
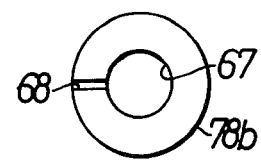
FIG. 12 is an upper end view of a tappet of the pump shown in FIG. 11.

FIG. 10 shows a modification of the hydraulic pump Ph, in which the same reference numerals are used to denote the parts or members corresponding to those in FIG. 9. In this hydraulic pump, at least one of the contact surfaces of the plunger 79 and the tappet 78 is provided with an oil well recess 67 and an orifice passage 68 connecting the recess 67 with the outside, as will be clearly seen from FIGS. 11 and 12. Although this passage 68 is a groove in the illustrated example, this may be formed as a bore.

Due to this arrangement, the tappet 78 is repeatedly brought into and out of contact with the lower face of the plunger 79. When the tappet 78 contacts the lower end of the plunger 79, the oil in the recess 67 is pressurized and discharged to the outside while being restricted by the orifice passage 68, thereby to produce an effective damping force to eliminate the mechanical impact at the moment of contact. As the tappet 78 is moved away, the oil in the pump chamber 76 is sucked into the recess 68 through the passage 67, so that the separation of the tappet from the plunger is made easily with little resistance.

Figure 13:
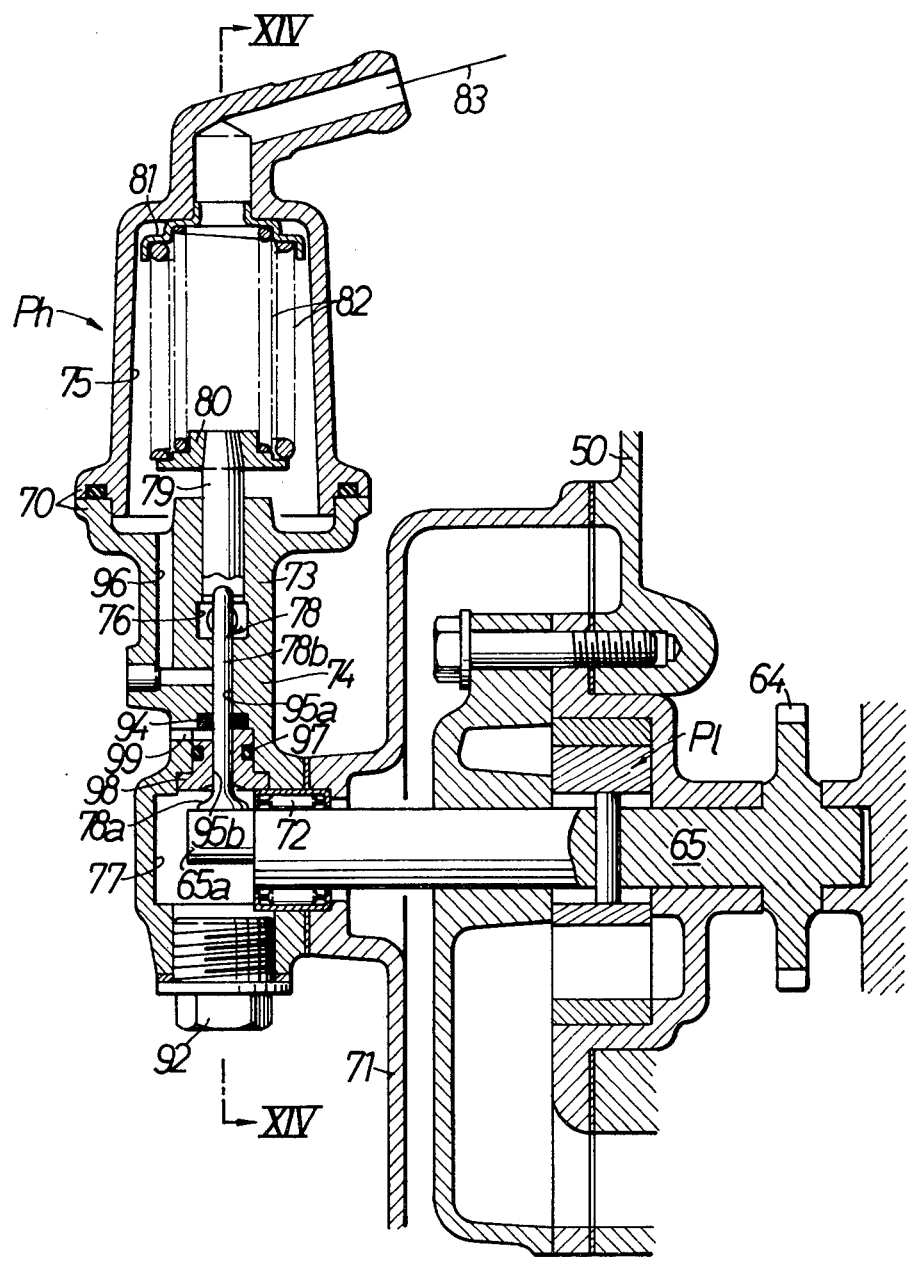
FIG. 13 is a vertical sectional front elevational view of another modification of the hydraulic pump.
Figure 14:
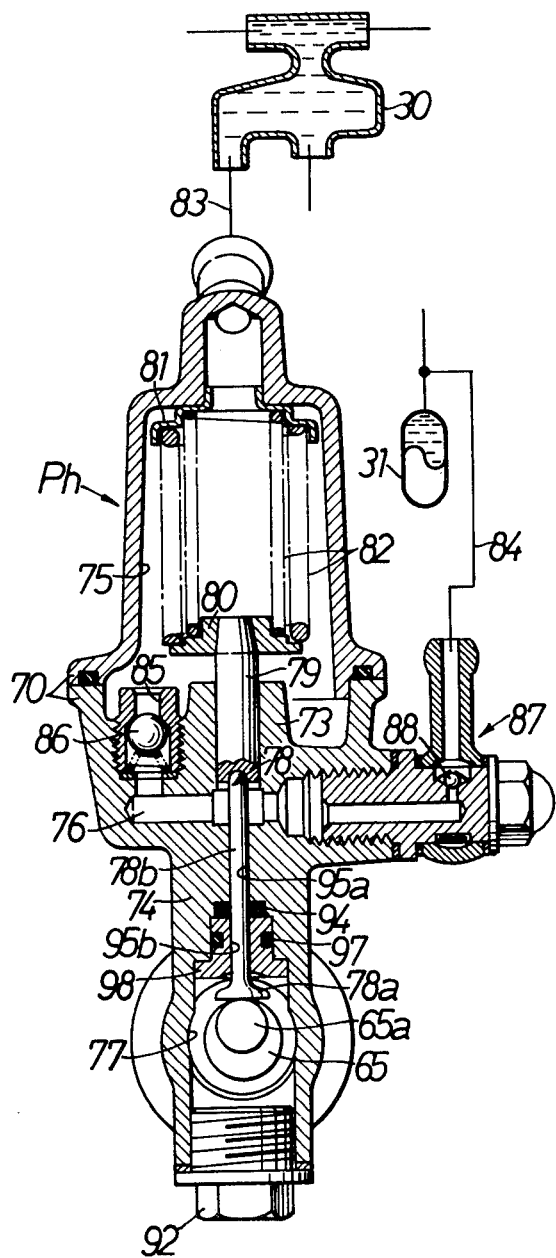
FIG. 14 is a sectional view taken along line XIV—XIV in FIG. 13.

FIGS. 13 and 14 show another modification of the hydraulic pump Ph, in which the same reference numerals are used to denote the same parts or members as those shown in FIGS. 8 and 9.

In this hydraulic pump, the second partition 74 is provided with a sealing member 94 making close contact with the outer periphery of the shaft 78a of the tappet 78. This seal member 94 divides the sliding guide bore for the tappet 74 in the second partition into a first guide bore 95a adjacent to the pump chamber 76 and a second guide bore 95b adjacent to the operation chamber 77. The inner surface of the intermediate portion of the first guide bore 95a is connected to the spring chamber 75. On the other hand, the second guide bore 95b is formed in a bush 98 mounted in the second partition 74 with a sealing member 97, while the inner surface of the upper end of the second guide bore 95b is opened to the atmosphere through a relief port 99. The operation chamber 77 stores the lubricating oil. During the reciprocating operation of the tappet 78, the sliding parts of the tappet 78 and the first guide bore 95a are effectively lubricated by the working fluid in the pump chamber 76 and the spring chamber 75, while the sliding surfaces of the second guide port 95b, tappet 78 and the cam 65a are lubricated by the lubrication oil in the operation chamber 77. The mixing between the working fluid and the lubricating oil is prevented by the sealing member 94. The working oil of high pressure flowing into the pump chamber 76 into the first guide bore 95a can be returned to the spring chamber 75 of low pressure through a communication bore 96 at an intermediate portion of the guide bore 95a. If the working fluid flows to the outside through the sealing portion 94, this working fluid is discharged to the outside thereby to further ensure the prevention of mixing of the working fluid and the lubrication oil.

It is thus possible to lubricate the sliding surfaces of the tappet 78 by the working fluid in the pump chamber 76 and the lubricating oil in the operation chamber 77. In addition, the parts in the operation chamber 77 to which a high load is applied, e.g. the eccentric cam 65a on the outer end of the pump drive shaft 65, can be positively lubricated by the specific lubrication oil. In addition, since the sealing member 97 partitioning the first and second guide bores 95a,95b at the small-diameter tappet 78 has an extremely small seal area, it can provide an extremely high sealing effect to completely avoid the undesirable mixing of the working fluid and the lubricating oil to avoid the deterioration of the performance of the fluid and oil.

Figure 4:
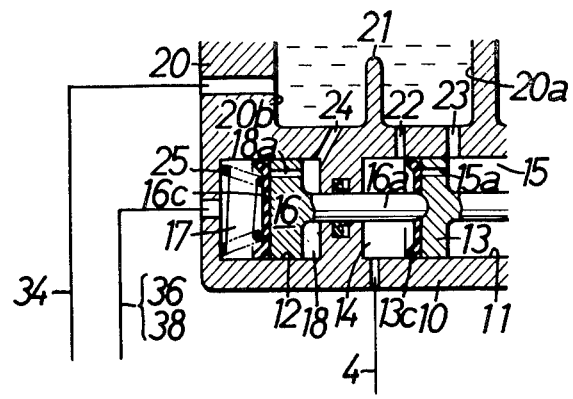
FIG. 4 is an enlarged longitudinal sectional view of a front master cylinder.

The operation of the brake system will now be described with reference to FIGS. 3 and 4.

As the brake lever 6 is operated to move the operation piston 13 of the front master cylinder Fm forwardly, the seal cup 13c of the piston 13 is moved beyond the relief port 22. Thereafter, hydraulic pressure is generated in the output chamber 14 in accordance with the distance of forward travel of the operation piston 13. This hydraulic pressure is transmitted to the front wheel brake Bf through the conduit 4 to actuate the front brake Bf thereby to apply a braking torque to the front wheel Wf.

In this case, the control piston 16 has moved forwardly together with the operation piston 13. Accordingly, the volume in the supply chamber 18 is increased to suck the hydraulic fluid from the reservoir 20a without substantial resistance through the supply port 24. In addition, since the conduit 38 is normally opened by the normally-opened type solenoid control valve 33f, the working fluid in the control chamber 17 is displaced into the auxiliary oil reservoir 30 through the conduit 38 as the control piston 16 moves ahead. Thus, the control piston 16 does not impose any resistance on the operation piston 13.

The oil delivered to the auxiliary oil reservoir 30 is returned to the reservoir chamber 20b through the conduit 34.

Assuming that the front wheel Wf is going to start locking on the road during this braking operation, then, the signal processing device Sp shown in FIG. 1 forecasts this condition by the signal derived from the front wheel sensor Sf. The processing device Sp then delivers a valve-open signal and a valve-close signal to the normally-closed control valve 32f and to the normally-opened control valve 33f, respectively. As these valves 32f,33f are operated in accordance with the above-mentioned signals, the passages 36 and 38 are opened and closed, respectively, so that the pressurized fluid is supplied from the accumulator 31 to the control chamber 17 of the front master cylinder Fm through the passage 36. This pressurized fluid then acts on the control piston 16 to slightly retract the operation piston 13 overcoming the force on the brake lever 6, thereby to reduce the pressure in the output chamber 14. In consequence, the braking torque on the front wheel brake Bf is reduced to avoid the locking of the front wheel Wf.

This state is immediately sensed by the signal processing device Sp, so that the latter resets the control valves 32f,33f to respective normal positions, thereby to reduce the pressure in the control chamber 17. In consequence, the braking torque of the front wheel brake Bf is increased again, so that the front wheel Wf is braked again. As this operation is repeatedly performed at high speed, the front wheel Wf is efficiently braked without undergoing locking.

As the brake lever 6 is relieved to dismiss the braking of the front wheel Wf, both pistons 13, 16 are moved back by the resetting force of the reset spring 25, so that the pressure in the output chamber is reduced to a valve below the atmospheric pressure. In consequence, the working fluid in the supply chamber 15 maintained at the atmospheric pressure is introduced into the output chamber 14 forcibly deflecting the outer peripheral portion of the seal cup 13c to open a gap between this seal cup and the inner wall of the cylinder bore 11. The surplus fluid is returned to the reservoir 20a through the relief port 22. In the meantime, the supply chamber 15 is supplied with the working fluid from the reservoir chamber 20a through the supply port 23.

On the other hand, the control chamber 17 is supplied with the working fluid also in the event of the retraction of the control piston 16, from the supply chamber 18 through the supply port 18a. Therefore, a circulation of the working fluid takes place in a path constituted by the reservoir chamber 20b, supply chamber 18, control chamber 17, passage 38, auxiliary reservoir 30, conduit 34 and the reservoir chamber 20b, due to the reciprocating motion of the control piston 16. It is, therefore, possible to prevent any bubbles from accumulating in the hydraulic control circuit including the control chamber 17.

As the rear master cylinder Rm is actuated by the operation of the brake pedal 7, the rear wheel brake Br is actuated substantially in the same manner. In the event that the rear wheel Wr is going to lack, the normally closed control valve 32r and the normally opened control valve 33r are operated to impart a back pressure to the rear master cylinder Rm, thereby to avoid the lacking of the rear wheel Wr.

What is claimed is:

1. A hydraulic pump comprising a pump body including first and second partitions dividing said pump body into a spring chamber, a pump chamber and an operation chamber, said first partition being between said spring chamber and said pump chamber, said second partition being between said pump chamber and operation chamber, said spring chamber having a fluid inlet, suction valve means connecting said pump chamber and spring chamber for providing communication therebetween when said pump chamber is at a reduced pressure, delivery valve means connected to said pump chamber for delivering fluid therefrom when fluid in said pump chamber is at elevated pressure, a drive member in said operation chamber, a tappet slidably engaged in said second partition and driven by said drive member, a plunger slidably engaged in said first partition and disengagably contacted by said tappet, said plunger and tappet being operative in said pump chamber to increase and decrease the pressure of the fluid therein, said tappet having a smaller diameter than said plunger, and spring means in said spring chamber acting on said plunger for resiliently biasing the same against said tappet.

2. A hydraulic pump as claimed in claim 1 comprising means providing communication between said spring chamber and operation chamber.

3. A hydraulic pump as claimed in claim 1, wherein said plunger and tappet have contact surfaces, at least one of which is provided with a recess serving as a fluid reservoir and a passage connecting said recess with the outside of said one contact surface.

4. A hydraulic pump as claimed in claim 3 wherein said passage constitutes a control orifice for flow of fluid to and from said recess.

5. A hydraulic pump as claimed in claim 1 wherein said drive member is driven in rotation and said tappet engages said drive member and is driven in reciprocation thereby.

6. A hydraulic pump as claimed in claim 5 wherein said plunger is axially aligned with said tappet for being driven thereby in opposition to said spring means.

7. A hydraulic pump as claimed in claim 6 wherein said suction valve means comprises a one-way valve for delivery of fluid from said spring chamber to said pump chamber, said delivery valve means comprising a second one-way valve for delivery of fluid from said pump chamber.

8. A hydraulic pump as claimed in claim 6 wherein said plunger is subjected to the bias of the spring means in one direction and to the pressure of the fluid in said pump chamber in the opposite direction and assumes a rest position when the bias of the spring means and the fluid pressure are equalized, said tappet then freely undergoing reciprocal movement.

9. A hydraulic pump as claimed in claim 1 which further comprises a seal member disposed in said second partition in sealed engagement with said tappet, said seal member dividing a guide bore in said second partition for said tappet into a first guide bore portion adjacent said pump chamber and a second guide bore portion adjacent said operation chamber, and means for supplying said operation chamber with lubricating fluid.

10. A hydraulic pump as claimed in claim 1 comprising an accumulator connected to said pump chamber through a check valve, said check valve acting to permit flow of fluid in the direction only from said pump chamber to said accumulator.

11. An anti-lock brake system for a vehicle having an engine, said brake system comprising: a wheel brake including an actuator for imparting braking force to a wheel of the vehicle; said actuator having a control hydraulic power chamber for imparting a back pressure to said actuator to reduce the braking force; a fluid reservoir; an accumulator; first passage means between said control hydraulic pressure chamber and said fluid reservoir; second passage means between said control hydraulic pressure chamber and said accumulator; solenoid control valve means disposed in said first and second passage means for selectively opening and closing said first and second passage means; and a hydraulic pump connected to and between said fluid reservoir and said accumulator and adapted to be driven by the engine of said vehicle; said hydraulic pump including means for halting fluid pumping action when pressurized fluid of a predetermined volume is stored in said accumulator.

12. An anti-lock brake system as claimed in claim 11 wherein said engine has a crankshaft, a clutch connecting said engine with the wheel of the vehicle, and speed reduction means operatively connecting said crankshaft to said hydraulic pump in a predetermined reduction ratio independently of said clutch.

13. An anti-lock brake system as claimed in claim 11 wherein said hydraulic pump comprises a pump body including first and second partitions dividing said pump body into a spring chamber, a pump chamber and an operation chamber, said first partition being between said spring chamber and said pump chamber, said second partition being between said pump chamber and operation chamber, said spring chamber having a fluid inlet connected to said reservoir, suction valve means connecting said pump chamber and spring chamber for providing communication therebetween when said pump chamber is at a reduced pressure, delivery valve means connected to said pump chamber for delivering fluid therefrom to said accumulator when fluid in said pump chamber is at elevated pressure, a drive member in said operation chamber, a tappet slidably engaged in said second partition and driven by said drive member, a plunger slidably engaged in said first partition and disengagably contacted by said tappet, said plunger and tappet being operative in said pump chamber to increase and decrease the pressure of the fluid therein, said tappet having a smaller diameter than said plunger, and spring means in said spring chamber acting on said plunger for resiliently biasing the same against said tappet.

14. An anti-lock brake system for a motorcycle having a frame, front and rear wheels on said frame, and a power unit including an engine mounted on said frame between said front and rear wheels, said anti-lock brake system comprising a wheel brake including an actuator for applying braking force to said wheels; said actuator having a control hydraulic power chamber for imparting a back pressure to said actuator to reduce the braking torque on said wheel brake; a fluid reservoir; an accumulator; first passage means interconnecting said control hydraulic power chamber and said fluid reservoir; second passage means interconnecting said control hydraulic power chamber and said accumulator; solenoid control valve means disposed in said first and second passage means for selectively opening and closing said first and second passage means; hydraulic pump means mounted on said power unit for supplying said accumulator with pressurized working fluid from said reservoir; said engine including a crankshaft, said power unit including a primary reduction gear connected to said crankshaft, a starting clutch driven from said primary reduction gear, and a pump drive shaft connected to said primary reduction gear and driving said hydraulic pump means independently of said starting clutch, said reservoir, accumulator and solenoid control valve means being constructed as a control unit which is mounted between said power unit and said rear wheel.

15. An anti-lock brake system as claimed in claim 14 wherein said engine has a crank chamber accommodating said crankshaft, said hydraulic pump means being attached to said power unit to be concealed behind said crank chamber.

16. An anti-lock brake system as claimed in claim 15 further comprising a lubricating pump for said engine, said lubricating pump having a drive shaft, said hydraulic pump being disposed in side-by-side relation with said lubricating pump and drivingly connected to the drive shaft of said lubricating pump.

17. An anti-lock brake system as claimed in claim 14 wherein said hydraulic pump comprises a pump body including first and second partitions dividing said pump body into a spring chamber, a pump chamber and an operation chamber, said first partition being between said spring chamber and said pump chamber, said second partition being between said pump chamber and operation chamber, said spring chamber having a fluid inlet connected to said reservoir, suction valve means connecting said pump chamber and spring chamber for providing communication therebetween when said pump chamber is at a reduced pressure, delivery valve means connected to said pump chamber for delivering fluid therefrom to said accumulator when fluid in said pump chamber is at elevated pressure, a drive member in said operation chamber, a tappet slidably engaged in said second partition and driven by said drive member, a plunger slidably engaged in said first partition and disengagably contacted by said tappet, said plunger and tappet being operative in said pump chamber to increase and decrease the pressure of the fluid therein, said tappet having a smaller diameter than said plunger, and spring means in said spring chamber acting on said plunger for resiliently biasing the same against said tappet.

18. A method of operating a hydraulic pump in an anti-lock brake system of a vehicle, said method comprising driving a hydraulic pump from an engine of the vehicle for pumping pressure fluid from a reservoir to an accumulator to store pressurized fluid in said accumulator, supplying said pressurized fluid from said accumulator to a brake actuator to reduce braking torque applied to a braked wheel of the vehicle when incipient skidding of the braked wheel is detected, and halting the pumping of the pressure fluid to relieve load on the engine when pressurized fluid of a predetermined volume is stored in the accumulator.

19. A method as claimed in claim 18 wherein said pump is driven in idle motion when the pumping is halted.

20. A method as claimed in claim 19 wherein the pump is driven from the engine independently of the drive of the wheels of the vehicle by the engine.

21. A method as claimed in claim 20 wherein the pump is driven from the engine with speed reduction.

* * * * *